United States Patent

[11] 3,615,219

| [72] | Inventors | Pranas Budininkas<br>Cicero;<br>George A. Remus, Chicago; Jack D. Zeff, Deerfield, all of Ill. |
|---|---|---|
| [21] | Appl. No. | 742,028 |
| [22] | Filed | July 2, 1968 |
| [45] | Patented | Oct. 26, 1971 |
| [73] | Assignee | General American Transportation Corporation |

[54] SULFUR DIOXIDE REMOVAL FROM A GAS
11 Claims, 2 Drawing Figs.

| [52] | U.S. Cl. | 23/226 |
|---|---|---|
| [51] | Int. Cl. | C01b 17/04 |
| [50] | Field of Search | 23/224–226, 178, 2 |

[56] References Cited
UNITED STATES PATENTS

| 3,199,955 | 8/1965 | West et al. | 23/226 |
| 1,815,888 | 7/1931 | Bailey | 23/123 X |
| 2,213,787 | 9/1940 | Von Girsewald | 23/226 |
| 2,631,087 | 3/1953 | Herndon | 23/226 |
| 3,454,355 | 7/1969 | Ryason | 23/2 |

FOREIGN PATENTS

| 312,769 | 6/1929 | Great Britain | 23/225 |

*Primary Examiner*—Oscar R. Vertiz
*Assistant Examiner*—G. O. Peters
*Attorney*—Claron N. White ABSTRACT: A process that removes sulfur dioxide from a gas containing sulfur dioxide treats the gas at an elevated temperature in the presence of a reducing gas and a catalyst for the reaction between the reducing gas and sulfur dioxide. When gas containing sulfur dioxide, such as flue gas and smelter gas, contains oxygen gas above a very low concentration, it is necessary to modify the process either by the use of additional reducing gas or by a pretreatment of the gas so as to decrease selectively the oxygen gas content or by the use of both modifications.

INVENTORS
Pranas Budininkas
George A. Remus
Jack D. Zeff
by Claron N. White att'y

SULFUR DIOXIDE REMOVAL FROM A GAS

BACKGROUND OF THE INVENTION

1. Field of the Invention

This invention relates to a process for the removal of a part of all of the sulfur dioxide content in a gas by the conversion of sulfur dioxide primarily or entirely to elemental sulfur. In the process, a gaseous reducing material, that is reactive with sulfur dioxide to form elemental sulfur, and the gas containing sulfur dioxide at a suitable elevated temperature are in contact with a catalyst for that reaction. The process contemplates the use of a higher concentration of gaseous reducing material to offset oxygen content or a combination of the process with a pretreatment to decrease oxygen gas content of the gas having the sulfur dioxide content. Following the pretreatment the oxygen concentration is generally above a very low value, so that the concentration of gaseous reducing material is sufficiently high to prevent the deleterious effect of the oxygen.

2. Description of the Prior Art

The discharge of waste gases, that are from various industrial processes and that contain sulfur dioxide, has presented a substantial air pollution problem. Also, the loss of sulfur dioxide to the air when it can be converted either directly or indirectly to the valuable materials, such as sulfuric acid and products from the latter, has resulted in the development of many processes for the recovery of sulfur values. At the same time, such recovery of sulfur has helped to reduce the air pollution problem.

As pointed out in U. S. Pat. No. 3,150,923, there are many waste gases that contain sulfur dioxide as a constituent. Such gases include flue gases, smelter gases, and off gases from chemical processes. It is indicated in that patent, that in the United States each year 21,000,000 tons of sulfur dioxide are added to the atmosphere by such gas. Nearly one-half is from the flue gases emitted from steam plant operations for the generation of electric power. The tonnage would be expected to be higher today than in 1962 when the patent application for that patent was filed.

As was pointed out in that patent, the flue gases usually contain a very low concentration of sulfur dioxide, for example, between 0.05 percent and 0.3 percent by volume of the flue gas. Because the total tonnage, introduced into the atmosphere by flue gases, is very substantial a very large volume of flue gases is emitted in a year. The smelter gases, which are obtained from the roasting of ores, contain about 5 to 10 percent sulfur dioxide. Both of these gases and the off gases, mentioned above, provide a public health problem. They have adverse effects as indicated in the patent.

The process of U. S. Pat. No. 3,150,923 is directed to an improvement in one type of sulfur dioxide removal process in which that compound is removed by absorption. Solid manganese dioxide is used. The patentees claim an effective removal of low concentrations of sulfur dioxide in waste gases, such as waste gas containing less than 1 percent sulfur dioxide.

Numerous processes have been developed for the removal of sulfur dioxide by reaction with a reducing gas to form elemental sulfur which can be removed from the resultant gas. As the reducing material, these processes use hydrogen, hydrogen sulfide, carbon monoxide, a hydrocarbon such as methane, or carbon. Many of these processes, developed over the years, are the subject of U.S. patents.

In the case of hydrogen as a reducing material for sulfur dioxide, U. S. Pat. No. 1,880,741 describes a process in which a mixture of one volume of sulfur dioxide gas and two volumes of hydrogen gas are passed over a "special catalyst" at a temperature preferably of 300° C. The catalyst uses a compound of iron, nickel or cobalt that is converted to an active material as described in the patent. The nature of the catalyst is illustrated by the statement that the active catalyst possibly functions either (1) as a partially reduced disulfide that forms an active surface film by a partial reduction by hydrogen or (2) by the reduction of the disulfide by hydrogen to form hydrogen sulfide which reacts with sulfur dioxide to form water and sulfur, a part of the latter regenerating the disulfide. The products are water and sulfur.

U. S. Pat. No. 2,631,087 describes a process in which hydrogen sulfide is used to reduce sulfur dioxide with the formation of elemental sulfur. This reaction is performed by passage of a gas containing these two gases over a catalyst that is activated alumina or bauxite. Because this part of the process requires hydrogen sulfide, the first part of the process converts some of the sulfur dioxide to elemental sulfur and some to hydrogen sulfide in a combustion furnace in which the sulfur dioxide reacts with a reducing component, such as a hydrocarbon. The combustion of part of the reducing component with introduced air produces sufficient heat for the various reactions involved in this first part of the process and for subsequent conversion steps including the catalytic reaction mentioned above.

U. S. Pat. No. 2,431,236 describes a process in which a hydrocarbon fuel, such as natural gas, is used to reduce sulfur dioxide in a gas in which it is present. The temperature for this rapid reduction is indicated as preferably about 1,200° C. The process is illustrated by the use of raw roaster or smelter gas that may contain 7 percent to 8 percent sulfur dioxide. Because such gas ordinarily contains about 10 percent oxygen, it is unnecessary to introduce air into the reduction furnace. At higher sulfur dioxide concentration, e.g., 10 percent or more, it is necessary to add air to the furnace. The air burns part of the natural gas and thus provides in the reactor the very high temperature of the gases that is required for the reduction of sulfur dioxide by the natural gas. After cooling of the gas from the furnace, elemental sulfur is removed by precipitation. The gas is then heated to about 200° C. The hydrogen sulfide, formed in the initial furnace from part of the sulfur dioxide, reacts, in contact with a bauxite catalyst, with unconverted sulfur dioxide to form sulfur and water. This reaction is exothermic.

U. S. Pat. No. 1,695,068 describes a process of treating a gas, such as smelter gas, containing a small amount of sulfur dioxide and a proportionately large amount of oxygen with a carbonaceous fuel. The combustion of the carbonaceous fuel by the large amount of oxygen is the gas results in the rise of the temperature above that required to maintain the reduction of sulfur dioxide. The temperature can rise to an undesirable temperature at which the ash and cinder from the fuel will fuse and clinker. To avoid this excessive temperature, carbon dioxide or thermally decomposable material that forms carbon dioxide is added. It reacts endothermically with the fuel to utilize the excess heat. The proper temperature is maintained for the reduction of sulfur dioxide by the carbonaceous fuel to sulfur. The product gas primarily contains nitrogen, carbon monoxide and sulfur vapor. This gas is mixed with a further amount of sulfur dioxide gas. The carbon monoxide and any hydrogen sulfide in the product react strongly exothermically with the added sulfur dioxide.

In the process disclosed in U. S. Pat. No. 1,169,726, the gas containing sulfur dioxide is heated to the necessary high temperature and then passed over incandescent coke that is at a temperature of 1200° C. The coke reduces sulfur dioxide to sulfur.

U. S. Pat. No. 1,140,310 discloses a variation in the process of reducing sulfur dioxide in a gas by passage of the gas over coke. A temperature for the coke of 1,300° C. is maintained by passing an electric current through the mass of incandescent coke. The necessity of temperatures above 900° C. to obtain at least 50 percent conversion of sulfur dioxide to sulfur is described.

U. S. Pat. No. 1,182,915 describes a process in which the gas containing sulfur dioxide and oxygen is passed over incandescent carbon but the gas is previously mixed with a proper relative amount of a gaseous reducing material, such as carbon monoxide. A portion of the gaseous reducing agent unites with the oxygen to supply the necessary increment of heat. Elemental sulfur is the product obtained by reaction of sulfur dioxide with part of the reducing agent. This process provides for the reduction of sulfur dioxide without any appreciable consumption of the incandescent carbon.

German Pat. No. 305,621, granted on Nov. 20, 1922, states that sulfur dioxide and hydrogen are known to react with each other forming sulfur when both gases are passed through tubes heated to a red heat. The patent also indicates that others had proposed the reduction of sulfur dioxide with hydrogen, hydrocarbons, carbon monoxide and water in the presence of platinum sponge, platinized pumice, magnesium oxide, calcium sulfide or iron oxide at a temperature between 760° and 1,000° C. It is further indicated that iron oxide had been proposed for use in conjunction with a material that is basic, such as limestone and calcium sulfide. These basic materials neutralize the sulfur dioxide. The process of this German patent uses iron oxide containing water of hydration alone or iron oxide on a carrier to provide a promoting influence in this reduction of sulfur dioxide by hydrogen. Instead of such iron oxide containing water of hydration, the patent also proposes the use of a mineral containing hydrated iron, for example, bauxite. The mechanism for the use of hydrogen, by which hydrogen sulfide is formed and the reaction of the latter with the remaining sulfur dioxide to form sulfur, is described. The patent suggests the use of hydrocarbons instead of hydrogen and indicates the undesirable compounds that are formed when a hydrocarbon or hydrogen is used. Carbon monoxide is mentioned as a reducing gas for this process but there follows a broad statement that an excess of reducing gas reacts with the sulfur that is formed.

Many years after the German patent was granted, U. S. Pat. No. 2,718,453 was granted for a process for removing sulfur dioxide from a gas by contacting the gas with finely divided solid material. Components that are oxides, hydroxides and carbonates of metals of the alkaline earth series are used. The temperature used is between 350° to 650° F. These compounds remove sulfur dioxide by absorption as described in the German patent as prior art. This U. S. Patent mentions that the compounds do not need to be pure and then states that fly ash collected from an electrostatic precipitator when coal was burned was found suitable for use in this process.

In addition to the foregoing patents for a description of various processes for the removal of sulfur dioxide, Information Circular 7836 of the United States Department of the Interior and published in 1958 contains an extensive survey of the literature on the subject. This pamphlet is entitled "SULFUR DIOXIDE—ITS CHEMISTRY AND REMOVAL FROM INDUSTRIAL WASTE GASES." The authors are D. Bienstock, L. W. Brunn, E. M. Murphy, and H. E. Benson.

P. R. Ryason & J. Harkins presented a paper entitled "A Method of Removing Potentially Harmful Oxides from Combustion Gases" at a joint symposium on experience with pollution control equipment. This symposium was presented before the Division of Petroleum Chemistry and the Division of Water, Air, and Waste Chemistry of the American Chemical Society at the Chicago meeting on Sept. 11–1967. This paper describes a process in which sulfur dioxide, in a gas containing it and carbon monoxide, carbon dioxide and nitrogen, was passed through a bed of different catalysts at 538° C. Of the various materials tested as catalysts, the most effective were copper on alumina, silver on alumina and palladium on alumina. The first two provided an average of 97 percent reduction. The third provided only 81 percent reduction, but it was indicated that channeling of the catalyst may account for the lower conversion.

Further testing of copper on alumina as a catalyst was reported. These tests used small amounts of sulfur dioxide, carbon monoxide, carbon dioxide and nitrogen oxides in nitrogen gas. The amount of reduction of sulfur dioxide was 95 percent. An oil-fired furnace was modified to permit recirculation of the combustion products to provide a simulated flue gas having an unstated oxygen content of a low level and a carbon monoxide concentration as high as 1.5 percent. The simulated flue gas was passed through beds of catalysts with an excess of 95 percent reduction. The catalysts were ruthenium on alumina and platinum on alumina.

SUMMARY OF THE INVENTION

This invention relates to a process for the removal of at least part of the sulfur dioxide content of a gas containing sulfur dioxide, preferably a gas containing a minor concentration of sulfur dioxide. The especially preferred gas is flue gas that is obtained by the combustion of coal, fuel gas or natural gas that contains a sulfur content. The sulfur is present in the fuel in combined form with other chemical elements.

In steam plant operation, such fuels are burned in a furnace and the thermal energy of the hot combustion products is partially transferred to water for conversion of the latter to steam. This transfer of thermal energy is provided by the use of firetube boilers or water-tube boilers. The construction of such boilers and furnaces are disclosed in the book entitled "STEAM-PLANT OPERATION," Third Edition, by E. B. Woodruff and H. B. Lammers and published in 1967 by McGraw-Hill Book Company, New York, N. Y. Because the combustion products pass through tubes or flues in fire-tube boilers, the combustion products are commonly referred to as flue gases. The term "flue gas" as used in this patent application means the combustion products obtained by the combustion of such sulfur-bearing fuels. Flue gas contains a very low concentration of sulfur dioxide. This concentration is usually between 0.05 percent and 0.3 percent by volume of the flue gas.

As mentioned earlier, another gas containing a minor concentration of sulfur dioxide is smelter gas. The usual range for that concentration is stated above. This is another example of gas treated by the present process.

The process of the present invention comprises: providing a gas that is at least in part derived from a gas containing a minor concentration of sulfur dioxide and that contains at least about two-thirds of a stoichiometric amount and preferably at least a stoichiometric amount of a gaseous reducing material relative to said sulfur dioxide in the provided gas; subjecting the provided gas at an elevated temperature to contact with fly ash for a sufficient time of contact to reduce at least a major portion of the sulfur dioxide and to form elemental sulfur from a major portion of the sulfur dioxide that is reduced; and separating elemental sulfur from the gaseous reaction product. The elevated temperature is sufficiently high during the time of contact to obtain a conversion of a major portion of the sulfur dioxide content. The maximum concentration of gaseous reducing material is determined by the amount of reduction of sulfur dioxide that results in elemental sulfur rather than sulfur compounds. This maximum concentration should provide an amount of elemental sulfur that is at least 50 percent of the sulfur content of all products formed from the sulfur dioxide conversion.

In the present process, the gaseous reducing material is a gas that is capable of reducing at least a major part of sulfur dioxide to elemental sulfur. Such gaseous reducing materials are carbon monoxide, hydrogen sulfide, aliphatic hydrocarbon and hydrogen. An example of an aliphatic hydrocarbon is methane. Mixtures of such gaseous materials can be used in the present process. Of these four gaseous reducing materials, carbon monoxide is preferred. An aliphatic hydrocarbon, such as methane, and hydrogen are preferred over hydrogen sulfide as the gaseous reducing material. The latter preference is based on the fact that, when using hydrogen sulfide for the reduction, the gaseous product, after the separation of elemental sulfur, contains hydrogen sulfide that it must be removed to avoid a pollution problem. Although hydrogen sulfide can be removed by conventional absorption processes, the necessity for such removal reduces substantially the desirability for its use in the present process.

Flue gas contains minor concentrations of carbon dioxide and oxygen and a very low concentration of sulfur dioxide. The balance is primarily nitrogen. A typical flue gas from the burning of coal will contain about 14.5 percent to about 15 percent carbon dioxide and up to about 3.5 percent oxygen. The concentration of sulfur dioxide has been mentioned above. Such flue gas can contain up to about 6 percent water.

The present process, when broadly stated, requires fly ash as the catalyst to constitute the invention. Fly ash is also called fly ash. The nature of fly ash and its manufacture will be presented below in the detailed description of the invention. The process of the invention, when it is stated more narrowly, requires either a pretreatment or requires the presence of additional reducing agent to compensate for oxygen content. For some of these narrower or limited embodiments of the process of the invention the catalyst is not limited to fly ash.

In some limited embodiments of the invention, the catalyst can be any material that is either capable of providing a reaction between the gaseous reducing materials and sulfur dioxide at a temperature at which such reaction in the absence of the catalyst does not occur or capable of enhancing the rate of reaction at a temperature at which such reaction occurs in the absence of a catalyst, preferably the former. Examples of such catalysts have been mentioned above with reference to processes disclosed in the prior art. Specifically, reference is directed above to those catalysts used in the process described in the article by P. R. Ryason and J. Harkins. In that case the gaseous reducing material was carbon monoxide. When the gaseous reducing material is hydrogen sulfide, hydrocarbon or carbon monoxide, the catalyst can be one of the materials used in the process of German Pat. No. 305,621.

As seen below in the detailed description of the invention, any of the gaseous reducing materials, such as carbon monoxide, hydrogen, hydrocarbon, and hydrogen sulfide, can be used to remove sulfur dioxide by the formation of elemental sulfur when the catalyst is fly ash. The removal of sulfur dioxide from a gas by the formation of elemental sulfur through contact by the provided gas that contains sulfur dioxide and gaseous reducing material with fly ash can be performed without any pretreatment or adjustment of amount of reducing agent provided the gas being treated contains less than 0.1 percent by volume of oxygen. It is preferred that the oxygen content in such case be less than 0.05 percent. Especially preferred is a gas with an oxygen concentration that is a maximum of 0.03 percent.

Because the industrial waste gases, such as flue gas and smelter gas, ordinarily contain a substantial amount of oxygen, as mentioned above, the process of this invention is performed under modified conditions with such gas of substantial oxygen content.

One modified embodiment of the present process is a pretreatment of the gas, containing a minor concentration of sulfur dioxide and containing a concentration of oxygen that exceeds 0.1 percent. In this modified embodiment, the gas is pretreated by contacting it with a carbonaceous material that is at an elevated temperature sufficient to cause reaction between oxygen gas and the carbonaceous material but is below that temperature at which there is a substantial reduction of sulfur dioxide by its reaction with the carbonaceous material. Preferably the temperature is below the minimum temperature for any such reaction between the carbonaceous material and the sulfur dioxide content of the gas. Examples of carbonaceous material are coke, activated charcoal, and bottom ash. Coke is preferred. Although coal is operative, it is generally undesirable to use it as the carbonaceous material, because it produces a gummy, tarry material.

In this modified embodiment of the process of this invention, the pretreatment of the gas with the carbonaceous materials at the elevated temperature can be performed until the oxygen content is a maximum of about 0.1 percent. It is unnecessary to provide for this degree of removal of oxygen content. Instead, it is preferred that a less rigorous combination of time of contact and temperature be used to reduce the oxygen content only to the extent that it is below about 1.4 percent and preferably below about 1 percent of the gas. In this aspect of this modified embodiment, the gas with the oxygen content reduced to the extent indicated above is placed in contact with the catalyst after the modified gas has been mixed with gaseous reducing material. The latter is added to provide a gas that contains a concentration of gaseous reducing material that is greater than the stoichiometric amount for reaction with the oxygen in the modified gas and preferably at least the sum of that amount and at least 40 percent of the stoichiometric amount for the reduction of sulfur dioxide. It is especially preferred that the concentration of gaseous reducing material at least equal the sum of the two stoichiometric amounts.

An alternative of this modified embodiment of the process is the pretreatment of the gas with an aliphatic hydrocarbon, preferably methane, at an elevated temperature and for a time to reduce the oxygen content sufficiently by reaction between oxygen and the hydrocarbon instead of using the carbonaceous material. In this alternative, the elevated temperature for the oxygen reduction is up to about 1,400° F. and preferably between about 1,000° F. and about 1,400° F. Then the treated gas is treated as described above with a gaseous reducing material in the presence of a catalyst to form elemental sulfur from sulfur dioxide.

This overall process, as stated above, is not limited to fly ash as the catalyst but the novel use of fly ash for sulfur dioxide removal is preferred in this limited embodiment of process of this invention.

In another modified embodiment of the present invention, the gas that is used contains a minor concentration of sulfur dioxide, such as flue gas and smelter gas, and has an oxygen content above about 0.1 percent. It actually has a substantially higher oxygen content. The process is performed without the pretreatment with carbonaceous material mentioned above. In this case, the gas containing sulfur dioxide and an undesirable concentration of oxygen is subjected to contact with the catalyst in the presence of an amount of gaseous reducing material that is greater than the stoichiometric amount relative to the oxygen content and preferably equal the sum mentioned above for the first modified embodiment of the process. Also especially preferred is a concentration of gaseous reducing material that is at least equal to the sum of the two stoichiometric amounts. In this modified embodiment of the process the gas to be treated preferably contains less than 1.4 percent oxygen. In this modified embodiment of the process, fly ash is the preferred catalyst but one of the catalysts taught by the prior art, such as mentioned above, can be used.

As seen from the foregoing there are two modified embodiments of the present process in which the catalyst used is not limited to fly ash. There is a third modified embodiment of the process in which fly ash is necessarily present as part or all of the catalyst, preferably as all of the catalyst. In this modified embodiment of the process the gas, from which sulfur dioxide is to be removed by reduction of it to elemental sulfur, is limited to flue gas. In this modified embodiment, the gaseous reducing material is added to the flue gas to provide the mixture of reactants, namely sulfur dioxide and gaseous reducing material. Carbon monoxide is the preferred gaseous reducing material that is added to reduce sulfur dioxide. However, rather than using sufficient carbon monoxide to compensate for any oxygen greater than 0.1 percent in the flue gas, a suitable amount of aliphatic hydrocarbon, preferably methane is introduced into the stream of flue gas. The hydrocarbon is fed to the stream at the place where carbon monoxide is being added or preferably at a place upstream of the zone of addition of carbon monoxide. The hydrocarbon will reduce suitably the concentration of oxygen gas and the added carbon monoxide will provide all or most of the reduction of sulfur dioxide. The elevated temperature for reaction of oxygen with hydrocarbon has been stated above.

The flue gas is treated before the removal of fly ash that is being carried with it from the combustion zone of a furnace of a steam plant operation. Of course, another catalyst may be added.

The gaseous reducing material is added to the stream of flue gas downstream of the combustion zone of the furnace, and upstream of the place at which the fly ash, that is being carried by the stream of flue gas, is separated from the flue gas. The place or zone of introduction or addition of the gaseous reducing material is such that the temperature of the mixture of flue gas and added gaseous reducing materials is at least that temperature at which the reaction between the sulfur dioxide and the gaseous reducing material can occur in the presence of the fly ash. Of course, the gaseous reducing material can be added to the flue gas that still contains fly ash and is too cool. Then the gas is heated for the reaction to form elemental sulfur.

The construction of furnace steam generators is disclosed in the book by Woodruff & Lammers mentioned above. After the flue gas has passed through a superheater for the steam and through an economizer to heat water for the boiler, it is about 1,200° F. This is a suitable place at which to introduce the gaseous reducing material. Downstream from this place of introduction the flue gas is cooled to a suitable temperature and then passed through an electrostatic precipitator.

The gaseous reducing material is added preferably to the flue gas before such cooling occurs to the extent that the reduction is inadequate or does not take place. Thus the addition is upstream of the separator for fly ash and a place in the travel or flow of the flue gas at which the temperature is sufficiently elevated to provide the catalytic reduction. The preferred place for introduction of the gaseous reducing material is just downstream of the economizer. The gaseous reducing material can be introduced at a place upstream of this place so long as it is downstream of the combustion zone of the furnace. When it is carbon monoxide, it is preferred that there be the addition also of hydrocarbon, preferably further upstream, to reduce oxygen gas content.

Downstream of the economizer the flue gas, containing entrained fly ash, is cooled in the conventional steam-plant operation to a sufficiently low temperature for removal of fly ash by an electrostatic precipitator. For electrostatic precipitation of fly ash the temperature of the flue gas entering the electrostatic precipitator is ordinarily below about 400° F. In this modified embodiment of the process of the present invention, it is preferred that the flue gas be cooled only to a temperature of at least about 400° F. and preferably at least about 450° F. The higher temperature for the gas passed into the electrostatic precipitator in the process of this invention avoids condensation of sulfur and its removal concomitant with fly ash. This would preclude separate, later recovery of valuable sulfur. Such is obtained in the process of the present invention by further cooling of the gas exiting from that electrostatic precipitator and then separating the sulfur, that condenses, from the gas.

That temperature at which sulfur condenses from the gas is dependent on the sulfur concentration. It is believed that 290° F. would result in substantial condensation when a sulfur dioxide content of 0.2 percent in a flue gas has been reduced to sulfur. This will occur at about 315° F. when that content is about 0.3 percent.

DESCRIPTION OF THE DRAWING

The process of the present invention is illustrated by preferred embodiments in the drawing, in which are presented two figures that are flow diagrams of these embodiments of the process, in which generally the same numerals are assigned to the same parts, and in which.

DETAILED DESCRIPTION

Figure 1:
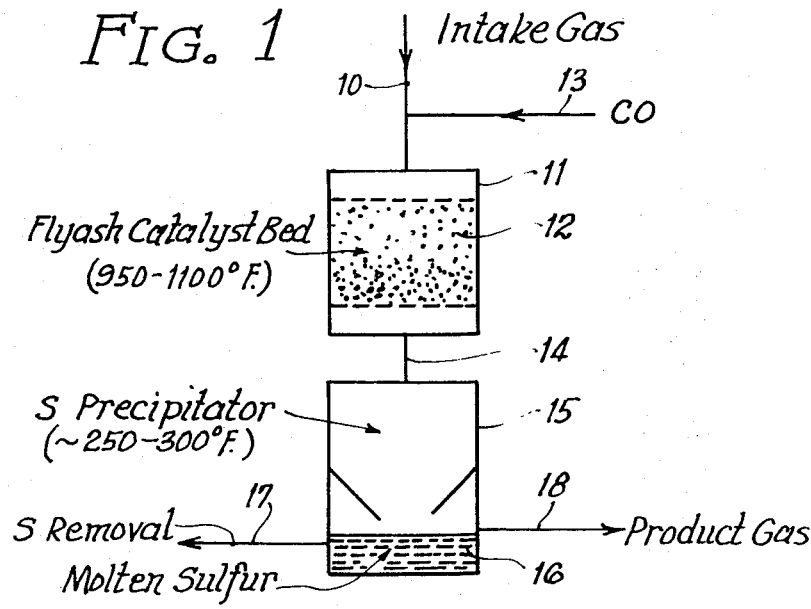
FIG. 1 is a flow diagram showing somewhat diagrammatically chambers in which there are certain operations and showing the use of carbon monoxide which is the gaseous reducing material.

Referring to FIG. 1, an intake gas containing sulfur dioxide, such as flue gas, is fed by a line 10 to a chamber 11 in which is located a bed 12 of fly ash through which the intake gas passes. A line 13 feeds carbon monoxide to line 10 for admixture of carbon monoxide with the intake gas that is fed to chamber 11. The temperature of bed 12 of fly ash in this illustrative embodiment is maintained in the range of about 950° F. to about 1,100° F. which is the preferred temperature range for the use of fly ash as a catalyst and for the temperature at which the intake gas has its sulfur dioxide content reduced to elemental sulfur by the carbon monoxide. The reaction product gas exits from chamber 11 through a line 14.

After cooling of the reaction product gas to a temperature of about 250° F. to about 300° F. the gas is passed by line 14 to chamber 15. The elemental sulfur that has been formed in chamber 11 is separated from the gaseous components in chamber 15. Because of the temperature of the gas and of the elemental sulfur, the latter is in liquid form and it descends to the bottom part of chamber 15 to form a body 16 of molten sulfur. The temperature in chamber 15 is between about 250° F. and about 300° F. As a result the separated sulfur remains molten. Molten sulfur can be removed from the body 16 of molten sulfur by line 17. The reaction product gas after this separation from it of elemental sulfur is removed from chamber 15 by a line 18.

The specific equipment or apparatus including that for mixing the intake gas and the carbon monoxide, that for cooling the gas from bed 11 to the temperature indicated above and that of the sulfur precipitator are within the skill of the art. Such forms no part of the present invention and the diagrammatic flow sheet suffices.

Figure 2:
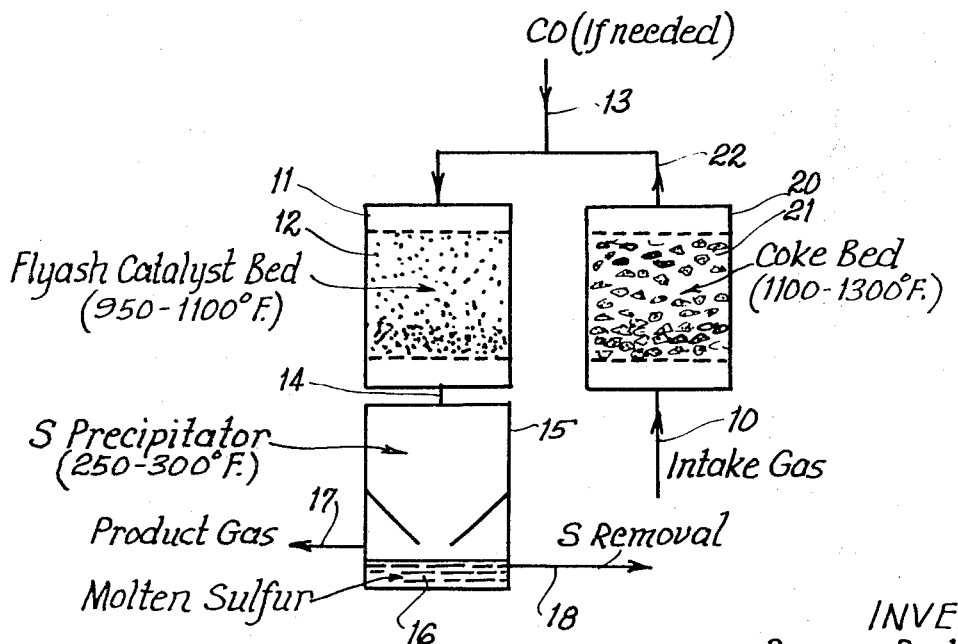
FIG. 2 is a similar flow diagram showing diagrammatically a modification in which the intake gas is pretreated in an additional chamber for reduction of oxygen content by contact with a carbonaceous material at an elevated temperature.

Referring to FIG. 2 the intake gas is introduced by a line 10 into a chamber 20 that contains a bed 21 of coke illustratively maintained between about 1,100° F. and about 1,300° F. The intake gas is illustratively flue gas that contains a substantial amount of oxygen and a very low concentration of sulfur dioxide. The intake gas has its oxygen content at least partially reduced by the contact with the hot coke. The resultant gas is passed from chamber 20 by a line 22 that feeds the gas to a chamber 11 containing a bed 12 of fly ash. The temperature of the fly ash bed is maintained illustratively within the preferred temperature range mentioned above for FIG. 1. In the event that the passage of intake gas through coke bed 21 does not provide a reduction of oxygen concentration to a value below 0.1 percent by volume of the gas, carbon monoxide is added to the gas in line 22 by a line 13 that connects with line 22.

As in the process shown in FIG. 1, the product gas exits chamber 12 by line 14 and after cooling is fed to chamber 15 in which sulfur is separated from the product gas which is removed from chamber 15 by line 17. The sulfur forms a body 16 of molten sulfur from which sulfur is removed by line 18.

Based on the various studies, including the examples presented below, that we have made to date, the following indicates the removal obtainable in an illustrative case for a flue gas having the following composition: sulfur dioxide between 0.2 percent and 0.3 percent; oxygen between 0 percent and 1.3 percent; carbon dioxide between 14 percent and 15 percent; water in the amount of 6 percent; and the balance being essentially nitrogen. From flue gases within this range of composition it is expected that the product gas obtained in line 18 from chamber 15 would contain: less than about 0.02 percent sulfur dioxide; between 0.03 percent and 0.09 percent oxygen; between 14 percent and 16 percent carbon dioxide; 6 percent water; a trace of COS; between 0.1 percent and 0.2 percent carbon monoxide; and the balance being essentially nitrogen.

Also, on the basis of work performed to date, intake gas fed by line 10 in the process disclosed in FIG. 2 and containing the same percentages of the constituents recited for the intake gas described above for FIG. 1 except for having an oxygen content of 3.5 percent, would be expected to be changed by that process to a product gas that would contain sulfur dioxide and oxygen in the ranges indicated above. The concentrations of water, COS and carbon monoxide in the product gas would also correspond with those mentioned above in connection with FIG. 1. The carbon dioxide content of the product gas would be higher, namely, between 21 percent and 22 percent. The balance of the gas would be essentially nitrogen.

The following examples illustrate the process of the invention and either serve to provide illustrations of specific embodiments of the invention that have been described above or serve to provide information on the basis of which other embodiments can be performed to determine optimum conditions with simple experimentation only.

In the examples that follow, the experiments were performed using as feed gas a mixture that is prepared by premixing dynamically the various components that are indicated as constituting the gaseous mixture. The premixing is obtained before the gases enter the reactor in which the gaseous mixture contacts the catalyst. In the case of the gases, they were obtained from commercial cylinders of the gas. When the gaseous mixture contained water vapor, such vapor was fed to the premixing zone with nitrogen by bubbling nitrogen through water in a gas dispersing bottle.

The examples illustrate the invention by using fly ash which is the novel catalyst that is useful in the various embodiments of the process. Of course, other materials already known to be catalysts can be used; for these other materials a simple determination of the preferred temperature range can be performed. It should be noted again that one of the embodiments mentioned above is limited to the use of fly ash alone or with another catalyst. That embodiment is performed in accordance with the teaching of these examples, but the fly ash is entrained with the flue gas to which the gaseous reducing material is added.

The following examples illustrate also the suitability of fly ash obtained from numerous sources. These examples are merely some of a larger number of experiments. In the study of the present invention, the fly ash that was used had been obtained from the following companies. They were obtained from specific locations of those companies and those usually represent the locations of the steam plant operations at which the indicated companies had obtained the fly ash as a waste material from such operation. The companies and the location from which they provided the fly ash examples were as follows:

West Penn Power Co., Monongahela, Pa.
Detroit Edison Co., Detroit, Mich.
Universal Atlas Cement, New York, N.Y.
Gifford-Hill Pipe Co., Grand Prairie, Tex.
Western Electric Co., Chicago, Ill.

The fly ash designated "Ridgeland Station Cyclone" is from a cyclone furnace of Western Electric Co. Fly ash is obtained from other types of coal-burning furnaces including those using spreading stokers and those using pulverized coal. These furnaces are described by Woodruff and Lammers in their book mentioned above. These various fly ashes are suitable; however, they vary in their effectiveness at particular conditions of temperature and space velocity.

Chemical analyses of fly ashes from three of these different sources have been made. The results are indicated below in table 1. In the first column are presented various oxides of chemical elements that are indicated as constituents of the fly ash. This is merely a conventional way of reporting the various chemical elements that are found in a material, but such reporting does not reflect or imply that the indicated chemical elements are present as such oxides. Instead they are combined in various unknown ways with other constituents that are listed.

The three fly ashes of table 1 are representative of fly ash even though there are variations in their compositions expressed as oxides. Fly ash is obtained as a waste material that is removed from flue gas by the use of dust-collecting systems that are described at pages 211—214 of the book by Woodruff and Lammers mentioned above. These authors at pages 213 and 214 state that fly ash, that has been removed from flue gases, presents a disposal problem. It is trucked and dumped. It is useful as a concrete filler and as an aid in compacting soil. In the former use only some types are suitable as particle size is important.

TABLE 1.—CHEMICAL ANALYSIS OF FLYASH SAMPLES

| Constituent: | West Penn Power Co. | Universal Atlas Cement | Ridgeland Station Cyclone |
|---|---|---|---|
| $SiO_2$ | 47.46 | 52.99 | 47.46 |
| $Fe_2O_3$ | 17.81 | 10.16 | 17.71 |
| $Al_2O_3$ | 22.52 | 28.26 | 17.74 |
| $TiO_2$ | 1.02 | 1.42 | 1.00 |
| $CaO$ | 5.52 | 1.74 | 5.02 |
| $MgO$ | 1.02 | 0.89 | 1.20 |
| $SO_3$ | 1.26 | 0.40 | 3.81 |
| $K_2O$ | 1.88 | 2.71 | 2.97 |
| $Na_2O$ | 0.86 | 1.07 | 2.54 |
| $P_2O_5$ | 0.55 | 0.22 | 0.34 |
| Undetermined | 0.10 | 0.14 | 0.21 |

NOTE: Constituents expressed as percent on ignited basis.

It can be seen from the chemical analyses of fly ash samples in table 1 that fly ash contains on a weight basis three major chemical elements. They are silica, iron oxide and alumina when expressed as oxides. They are probably in a structure with silicon and with oxygen bridging with part of the aluminum atoms participating in the bridging structure so that the material is primarily an aluminosilicate. Of course, it is not necessary that the nature of the structure be known. It is a fact that fly ash is a catalyst for the process of the present invention. It may be noted that these three chemical elements expressed as their oxides, constitute on a weight basis at least about 75 percent of the fly ash when determined after ignition to remove volatile materials. Again it is noted that the approximate ranges for these three chemical elements expressed as oxides on a weight basis are between about 45 percent and about 55 percent for $SiO_2$, between about 10 percent and about 20 percent for $Fe_2O_3$, and between about 15 percent and about 30 percent for $Al_2O_3$.

In the following examples the fly ash as obtained was moistened and then pressed into pellets that were one-eighth inch or three-eighths inch in diameter and approximately one-eighth inch to one-quarter inch in length. The apparatus included equipment for dynamic premixing of the gases that were passed through the reactor containing (except for tests Nos. 1 and 2) a bed of these pellets of fly ash. The gaseous mixture fed to the bed was sampled. The product gas coming from the bed of the pellets was also sampled. These samples of gases were subjected to gas chromatographic analysis.

In the examples that follow the tables refer to test numbers. In some of the cases two or more tests are indicated for a horizontal line of the tabulation. This indicates that in one run using the fly ash catalyst and the gaseous feed there were two or more determinations made of the product. As a result the information, shown for the product and the calculations based on that analysis, represent either an average of or a range from the values obtained in the individual determinations.

EXAMPLE 1

Various runs were made using a gaseous mixture that contained different concentrations of sulfur dioxide and different concentrations of carbon monoxide as indicated in table 2, presented below. The carbon monoxide concentration is indicated indirectly by the stated ratio of carbon monoxide to sulfur dioxide. In these runs the temperature was 1,100 F. for the reaction in the chamber containing the bed of fly ash or lacking such bed, the latter being indicated in test Nos. 1 and 2. The space velocity was varied between 750 and 1,500 hr.$^{-1}$.

In these runs the gaseous feed had a carbon dioxide content that was between 0 and 14 percent by volume. The water vapor content was between 0 and 3 percent. The oxygen content was less than 0.1 percent by volume and nitrogen constituted the balance of the feed gas.

In the preceding paragraph it was indicated that the oxygen content was less than 0.1 percent. At the time that test Nos. 1 through 13 were performed the gas chromatographic analysis of both the intake gas or feed gas and the product gas indicated that there was between 0.7 percent and 0.8 percent oxygen. At that time it was concluded that sulfur dioxide could be reduced by carbon monoxide in the presence of fly ash even though 0.7 percent to 0.8 percent oxygen were present. However, later work some of which is reported below, indicated that the sampling equipment in some unexplained manner introduced air and thus oxygen. Oxygen was not actually present in the feed gas that passed through the reactor that contained no catalyst in tests Nos. 1 and 2 or contained fly ash in the tests Nos. 3 through 13.

In the foregoing presentation of the actual oxygen content of the intake gas in the first 13 tests of table 2 it should be pointed out that although there were 13 determinations, there were only seven runs.

The conclusion with respect to the actual oxygen content in those tests was based on later experiments that indicated sulfur dioxide is reduced by carbon monoxide in the presence of fly ash at the temperature used only when the oxygen content is below about 0.1 percent. This statement is limited to the use of carbon monoxide in about the stoichiometric amount. It will be seen later that the deleterious effect of oxygen can be overcome by providing a higher concentration of carbon monoxide.

ratio indicated in the case of test Nos. 7 and 8 in which the ratio was 6. A very substantial amount is converted to COS. In one determination the analysis indicates that all of the sulfur dioxide was converted to COS. In these runs the effect of too high a ratio carbon monoxide to sulfur dioxide is clearly established.

EXAMPLE 2

The results of this example are presented in table 3 that follows. The feed gas contained an amount of oxygen between 1 percent and 3 percent. The results show that 1 percent oxygen in the feed gas does not impair the catalytic reduction by carbon monoxide. However, as the oxygen concentration in the feed gas is increased the reduction of sulfur dioxide is decreased. However, with an oxygen content as high as 1.3 percent by volume of the feed gas the carbon monoxide can provide for a high percentage of reduction of sulfur dioxide to sulfur. At 2 percent oxygen content in the feed gas, the sulfur dioxide reduction is decreased substantially. The carbon monoxide concentration is the same as that in feed gases of lower oxygen concentration. It is expected that the approxi-

TABLE 2.—EXAMPLES OF SO$_2$ REDUCTION BY CO

| Test No. | Flyash | Feed | | Product | | Percent SO$_2$ removed | | |
|---|---|---|---|---|---|---|---|---|
| | | SO$_2$, percent | CO/SO$_2$ ratio | SO$_2$, percent | COS, percent | Total | As S | As COS |
| 1 | None | 0.42 | 2.0 | 0.42 | (1) | 0 | 0 | 0 |
| 2 | do | 0.43 | 2.0 | 0.42 | (1) | 0 | 0 | 0 |
| 3-6 | West Penn Power Co | 0.51 | 1.8 | 0.04 | (1) | 92 | 92 | 0 |
| 7,8 | Detroit Edison | 0.20 | 2 6.0 | (1) | 0.05-0.20 | 100 | 0-75 | 25-100 |
| 9-11 | Universal Atlas | 0.29 | 2.1 | (1) | 0.04 | 100 | 86 | 14 |
| 12 | Gifford-Hill | 0.28 | 5.0 | (1) | (1) | 100 | 100 | 0 |
| 13 | Ridgeland Station | 0.36 | 1.7 | 0.26 | (1) | 28 | 28 | 0 |
| 14 | West Penn Power Co | 0.26 | 3.4 | 0.06 | 0.01 | 77 | 73 | 4 |
| 15-16 | do | 0.26 | 3.8 | (1) | 0.01 | 100 | 96 | 4 |
| 17-24 | do | 0.28-0.34 | 4.4-4.6 | (1) | (1) | 100 | 100 | 0 |
| 25-26 | do | 0.31 | 2.6 | 0.05 | (1) | 84 | 84 | 0 |
| 27,28 | Western Electric | 0.29 | 3.2 | 0.03 | 0.01 | 90 | 86 | 4 |

1 Not detected.
2 This is high excess of CO.

The data in table 2 provide several conclusions. Firstly, it is seen that, at the temperature used, there is no reduction of sulfur dioxide by carbon monoxide when the gaseous mixture is passed through the reactor that contains no fly ash. Secondly, a high degree of reduction of sulfur dioxide to elemental sulfur is obtained when the gaseous mixture at the indicated temperature is passed through and thus in contact with fly ash obtained from any of a number of sources. In some cases it appears that some fly ash is more effective than others, but this can be attributed in part to the fact that the indicated ratios of carbon monoxide to sulfur dioxide are not precisely the values stated. This is because the gas chromatographic analysis, particularly of carbon monoxide, is less precise than would be desired. Also less desirable results can be obtained by using a space velocity at the high end of the range stated in that table.

With regard to the ratio of carbon monoxide to sulfur dioxide attention is directed to test Nos. 9 through 11. It is indicated there that the reduction of sulfur dioxide, even though complete, results in the conversion of 14 percent of the sulfur dioxide to COS. The indicated ratio is 2.1 but it is apparent that the ratio was higher. The effect of a substantially higher mate same result would be obtained when using a feed gas of about 1.4 percent oxygen with the same carbon monoxide concentration. At first blush, tests Nos. 36 through 38 appear to be contrary to the last statement. However, it should be noted that the concentration of carbon monoxide in that feed gas is higher than the other tests with 2 percent oxygen or with oxygen concentration of 1.3 percent or lower.

Because of the higher carbon monoxide content the reduction of sulfur dioxide in tests Nos. 36-38 is complete but a substantial amount of the reduction results in the formation of COS. This generally undesirable result is obtained in test No. 40 with a gas containing 2.1 percent oxygen and an even higher carbon monoxide content than test No. 39. This formation of generally undesirable COS instead of a maximum formation of elemental sulfur is brought out more clearly by tests Nos. 41 through 43 in which the feed gas contained 3 percent oxygen and the highest concentration of carbon monoxide of any of the tests reported in table 3.

Again it should be reported that the carbon monoxide concentration is not necessarily that precisely shown in Table 3 but the relative concentrations would generally be true.

TABLE 3.—REDUCTION OF SO$_2$ BY CO IN THE PRESENCE OF O$_2$

Temperature: 950-1,300° F.
Space Velocity: 750-1,500 hr.$^{-1}$
Flyash source: West Penn Power Co.
Feed contains 14.5-15.0% CO$_2$ and 0-3% H$_2$O.

| | Percent | | | | | | | |
|---|---|---|---|---|---|---|---|---|
| | Feed | | | Product | | SO$_2$ removed | | |
| Test No. | SO$_2$ | CO | O$_2$ | SO$_2$ | COS | Total | As S | As COS |
| 29 | 0.30 | 2.4 | 1.0 | n.d. | n.d. | 100 | 100 | 0 |
| 30 | 0.28 | 2.5 | 1.0 | n.d. | n.d. | 100 | 100 | 0 |
| 31 | 0.28 | 2.4 | 1.1 | 0.04 | 0.007 | 88.5 | 86 | 2.5 |
| 32, 33 | 0.25 | 2.6 | 1.2 | n.d. | 0.007 | 100 | 97.2 | 2.8 |
| 34 | 0.26 | 2.6 | 1.3 | n.d. | 0.007 | 100 | 97.3 | 2.7 |
| 35 | 0.26 | 2.5 | 1.3 | 0.03 | 0.014 | 86.4 | 81.0 | 5.4 |
| 36-38 | 0.27 | 2.9 | 1.4 | n.d. | 0.05 | 100 | 81.5 | 18.5 |
| 39 | 0.30 | 2.6 | 2.0 | 0.08 | 0.014 | 73.3 | 68.6 | 4.7 |
| 40 | 0.27 | 3.1 | 2.1 | 0.01 | 0.03 | 95.5 | 84.5 | 11.0 |
| 41-43 | 0.31 | 5.3 | 3.0 | n.d. | 0.13-0.25 | 100 | 19-58 | 42-81 | n.d. means not detected.

EXAMPLE 3

This example illustrates the reduction of sulfur dioxide by the use of carbon monoxide and fly ash as the catalyst at various temperatures. In all but the last test in table 4, shown below, the fly ash was that obtained from West Penn Power Co. The test No. 56 used Detroit Edison fly ash.

TABLE 4.—REDUCTION OF $SO_2$ BY CO AT VARIOUS TEMPERATURES

Experimental Conditions:
  Space Velocity: 750 hr.$^{-1}$
  Feed:
    $SO_2$—0.26–0.44% (±.01%).
    CO—0.70–1.1%.
    $CO_2$—14.5%.
    $O_2$—0.03%.
    $H_2O$ vapor—0–3%.
    $N_2$—Balance.

| Test No. | Temp., °F. | Percent $SO_2$ removed | | |
|---|---|---|---|---|
| | | Total | As S | As COS |
| 29, 30 | 1,100 | 87 | 87 | 0 |
| 15, 16, 31 | 1,100 | 100 | 96 | 4 |
| 32, 33 | 1,050 | 96 | 92 | 4 |
| 34, 35 | 1,000 | 98 | 94 | 4 |
| 36, 37 | 1,000 | 100 | 84 | 16 |
| 38, 39 | 950 | 100 | 90 | 10 |
| 40 | 900 | 87 | 73 | 14 |
| 41–46 | 900 | 82 | 68 | 14 |
| 47, 48 | 900 | 90 | 69 | 21 |
| 49, 50 | 850 | 87 | 71 | 16 |
| 51–55 | 800 | 84 | 64 | 20 |
| 56 | 750 | 13 | 13 | n.d. | n.d. means not detected.

Although the last runs of table 4 indicate that some reduction of sulfur dioxide can occur at a temperature as low as 750° F. using carbon monoxide in the gaseous mixture that is in contact with fly ash, the process requires a higher temperature to insure an adequate degree of reduction of sulfur dioxide. The data, except for the first line, indicate that some of the sulfur dioxide is converted to COS. As much as 21 percent of the $SO_2$ reduced is converted to COS. However, it should be noted from table 4 that the ranges for sulfur dioxide and carbon monoxide provide in some cases for a ratio of carbon monoxide to sulfur dioxide that is greater than 2 which is the stoichiometric value. Thus a higher degree of reduction of sulfur dioxide to elemental sulfur can be obtained by suitable control of that ratio.

The data also indicate that a preferred temperature range is between about 950° F. and about 1,100° F.

EXAMPLE 4

In this example, as shown by table 5 that follows, other reducing gases are substituted for carbon monoxide. In these tests no oxygen was added in the preparation of the intake or feed gas. Oxygen may be present in a trace amount, merely as an impurity from one or more of the gases used. The concentration would be less than 0.1 percent oxygen.

The test results using hydrogen sulfide indicate the operativeness of fly ash as a catalyst for the reduction of sulfur dioxide using hydrogen sulfide as the reducing gas. The data indicate that the temperature should be substantially above 550° F. to provide for reduction of a major part of the sulfur dioxide content of the intake gas. At 700° F. there is a reduction of 80 percent of the sulfur dioxide content by this use of hydrogen sulfide but this test resulted, as did the tests at lower temperatures, in a product gas in which hydrogen sulfide is present. This presence of hydrogen sulfide in the product gas is a pollution problem in itself. The removal of hydrogen sulfide can be accomplished; however, this adversely affects the economy of the process.

The excess amount of hydrogen sulfide present in the tests using that material and set forth in table 5 is unknown but it is estimated that the excess was 10 percent to 50 percent greater than the stoichiometric amount.

Table 5 shows that it is preferable to use an aliphatic hydrocarbon, such as methane, or hydrogen as the gaseous reducing material in the present process instead of hydrogen sulfide. Even though the estimated concentration of methane was between a slight excess and up to 100 percent in excess of the stoichiometric amount, all of the sulfur dioxide that was reduced was converted to elemental sulfur. The same was true when using hydrogen. Its estimated concentration was between 15 percent and 60 percent in excess of the stoichiometric amount.

The foregoing comments regarding the differences between hydrogen sulfide on the one hand and methane and hydrogen on the other for the present process establishes the substantial desirability of using fly ash as the catalyst as compared with catalysts of a different type, specifically those described in the German patent mentioned above. Hydrogen in excess in the process of that patent resulted in hydrogen sulfide, and an excess of a hydrocarbon produced a sulfur containing hydrocarbons.

The data is table 5 for reduction of sulfur dioxide with methane while in contact with fly ash indicate that the operative temperature should be at least 1,500° F. and preferably at least 1,600° F. for a space velocity within the range that is stated. These are temperatures that are higher than that required when using carbon monoxide in the process. Thus methane and other aliphatic hydrocarbons are less preferred than carbon monoxide.

A comparison of the results at 900° F. using hydrogen and the same temperature using carbon monoxide (the latter in table 4 ) indicates that carbon monoxide is preferred to hydrogen as the reducing gas. In view of the high degree of reduction of sulfur dioxide using hydrogen at 1,100° F. it would appear that hydrogen would be preferred over carbon monoxide because carbon monoxide can result in some un-

TABLE 5.—REDUCTION OF $SO_2$ USING REDUCING AGENTS OTHER THAN CO

Experimental conditions:
  Space velocity: 750–1,500 hr.$^{-1}$
  Feed: $SO_2$, $N_2$, reducing gas
  Reducing gas concentration: Variable, slight excess
  Temperature: Variable, as indicated
  Flyash source: West Penn Power Co.

| Test No. | | Temp., °F. | $SO_2$ | | | Remarks |
|---|---|---|---|---|---|---|
| | | | Feed, percent | Product, percent | Removed, percent | |
| 57 | Hydrogen sulfide | 400 | 0.38 | 0.31 | 18.5 | Elemental S deposited. $H_2S$ present in product. |
| 58, 59 | do | 450 | 0.38 | 0.26 | 32 | Do. |
| 60, 61 | do | 500 | 0.40 | 0.27 | 33 | Do. |
| 62, 63 | do | 550 | 0.40 | 0.30 | 25 | Do. |
| 64 | do | 550 | 0.20 | 0.12 | 40 | Do. |
| 65, 66 | do | 700 | 0.35 | 0.07 | 80 | Do. |
| 67 | Methane | 1,100 | 0.32 | 0.25 | 22 | Elemental S deposited. No other S compound in product. |
| 68, 69 | do | 1,400 | 0.32 | 0.29 | 9.4 | Do. |
| 70–73 | do | 1,500 | 0.32 | 0.24–0.29 | 15–30 | Do. |
| 74 | do | 1,600 | 0.28 | 0.16 | 43 | Do. |
| 75 | do | 1,600 | 0.32 | 0.09 | 72 | Do. |
| 76–80 | Hydrogen | 900 | 0.30 | 0.25 | 16.7 | Do. |
| 81, 82 | do | 1,100 | 0.32 | 0.05 | 84.5 | Do. |
| 83, 84 | do | 1,100 | 0.32 | 0.00 | 100 | Do. | desirable COS being formed, unless the conditions are properly controlled. However, it is safer to sue carbon monoxide. Of course, a mixture of these two gases, e.g. water gas, can be used.

EXAMPLE 5

The undesirability of a high concentration of oxygen in the gas containing sulfur dioxide has been established by an earlier example. As stated much earlier, flue gas generally contains up to 3.5 percent oxygen and certainly such concentration exceeds the desired value for the gas to be fed the reduction process. This is because the higher carbon monoxide concentration required can result in an undesirable percentage of the sulfur dioxide being converted to undesirable COS instead of elemental sulfur.

This example by table 6 illustrates how such feed gas with high oxygen content can be pretreated to provide a gas containing sulfur dioxide and containing a sufficiently low oxygen content that the reduction process can be subsequently performed with a high percentage of sulfur dioxide being reduced to elemental sulfur.

burning of coal in steam plant operations. Bottom ash is also called clinker. It is the bottom ash removed, for example, from stoker furnaces. The manner in which it is obtained is described at the bottom of page 150 and the top paragraphs of page 157 of the book by Woodruff and Lammers mentioned above.

The bottom ash reduces oxygen concentration without any or with very slight carbon monoxide formation.

EXAMPLE 6

This example illustrates the overall process, that is presented in FIG. 2 and that is suggested from the description of the earlier examples as an overall process to treat a gas containing sulfur dioxide and a high concentration of oxygen to obtain a substantial reduction of sulfur dioxide primarily to elemental sulfur.

The activated carbon used in test No. 97 in table 7 of this example is a material obtainable from Witco Chemical Co., Inc.

TABLE 6.—REMOVAL OF $O_2$ AND FORMATION OF CO BY COKE

Feed: $SO_2$—as indicated
$O_2$—as indicated
$CO_2$—13–14%
$N_2$—balance.
Coke bed: 40 cc.

| Test No. | Material | Particle size, mesh | Temp., °F. | Space velocity, hr.$^{-1}$ | Feed $O_2$, percent | Product, percent $O_2$ | Product, percent CO | |
|---|---|---|---|---|---|---|---|---|
| 85 | Coke | 6–8 | 1,100 | 1,500 | 3.5 | 1.66 | 0.7 | |
| 86 | do | 6–8 | 1,100 | 1,500 | 3.5 | 1.01 | 0.95 | |
| 87 | do | 6–8 | 1,100 | 1,500 | 3.5 | 0.84 | 0.75 | |
| 88 | do | 6–8 | 1,200 | 1,500 | 3.6 | 1.1 | 0.84 | |
| 89 | do | 100–200 | 1,300 | 6,000 | 3.5 | 0.86 | 0.65 | |
| 90 | do | 14–20 | 1,100 | 750 | 3.9 | 0.56 | 1.2 | {Feed: 0.25% $SO_2$. Product: 0.26% $SO_2$.} |
| 91 | do | 14–20 | 1,100 | 750 | 3.9 | 0.69 | 1.4 | {Feed: 0.30% $SO_2$. Product: 0.30% $SO_2$.} |
| 92–94 | Bottom ash | 10–40 | 1,100 | 1,500 | 3.9 | 0.75 | (¹) | |
| 95, 96 | do | 10–40 | 1,100 | 1,500 | 3.9 | 0.71 | 0.03 | |

¹ Not detected.

TABLE 7.—REDUCTION OF $SO_2$ USING CO PRODUCING AND FLYASH BEDS IN SERIES

Feed: Contains no CO; Contains $SO_2$, $O_2$, $CO_2$, $N_2$, $H_2O$.
No $SO_2$ removed by first bed.

| Test No. | Material | Particle size | Temperature, °F. Coke bed | Temperature, °F. Catalyst bed | Percent Feed to coke reactor $SO_2$ | Percent Feed to coke reactor $O_2$ | Percent Product from flyash reactor $SO_2$ | Percent Product from flyash reactor COS | $SO_2$ removal Total | $SO_2$ removal as S | $SO_2$ removal as COS |
|---|---|---|---|---|---|---|---|---|---|---|---|
| 97 | Activated carbon | 6–12 mesh | 1,100 | 1,100 | 0.39 | 4.1 | 0.03 | 0.07 | 92 | 74 | 18 |
| 98 | do | do | 1,200 | 1,200 | 0.30 | 3.3 | n.d. | n.d. | 100 | 100 | 0 |
| 99 | Coke | ¼″ lumps | 1,300 | 1,100 | 0.30 | 3.9 | 0.08 | n.d. | 73 | 73 | 0 |
| 100 | do | do | 1,300 | 1,100 | 0.24 | 3.4 | 0.13 | 0.03 | 46 | 34 | 12 |
| 101 | do | do | 1,100 | 1,100 | 0.40 | 0.75 | 0.02 | 0.03 | 95 | 87 | 8 |
| 102 | Activated charcoal | | 1,180 | 1,100 | 0.20 | 2.9 | n.d. | n.d. | 100 | 100 | 0 | n.d. means not detected.

The foregoing table 6 illustrates the use of two different carbonaceous materials for this pretreatment. The data presented to the far right with the results of tests Nos. 90 and 91 show that this pretreatment does not affect sulfur dioxide. The prior art processes that were described above and that passed hot gas containing sulfur dioxide over coke resulted in the reduction of sulfur dioxide to hydrogen sulfide or sulfur depending on whether a reducing gas was also present. Thus it is apparent that a different result is obtained by the pretreatment process that is illustrated in table 6. The temperature for such pretreatment has an upper limit to avoid substantial sulfur dioxide reduction in the treatment of such gas with coke or other carbonaceous material.

Bottom ash, used as one of the carbonaceous materials in the tests presented above in table 6, is waste product from the burning of coal in steam plant operations. Bottom ash is also In all but the last two tests reported in table 7 the fly ash was that obtained from Universal Atlas. Detroit Edison fly ash was used for the last two tests of table 7.

In view of the comments regarding the earlier examples it is sufficient to note merely that the overall process is established as clearly effective. Attention is directed particularly to the two examples in which there is a 100 percent removal of sulfur dioxide as elemental sulfur even through initial feed gases contain 3.3 and 2.9 percent oxygen.

In those two most successful tests and in the other reported tests in table 7, no carbon monoxide was introduced from a separate source. Instead the carbon monoxide used for the reduction of sulfur dioxide was obtained from the reduction of oxygen by the carbonaceous material in the pretreatment. Of course, when the oxygen content is substantially lower than 3 percent and when the pretreatment with carbonaceous material is at less than optimum conditions the amount of carbon monoxide can be insufficient except by the separate addition of carbon monoxide before the gas passed from the pretreatment to the treatment in contact with fly ash.

Table 7 illustrates the process in which the entire gas stream is passed through the bed of carbonaceous material that reduces oxygen content and forms carbon monoxide. Alternatively, part of the gas can be so treated and then recombined with the other part before the catalytic treatment.

In view of the results in example 5 with bottom ash, it would be necessary in all cases where it would be used as the carbonaceous material for the pretreatment to reduce oxygen content, to add carbon monoxide.

The treatment with carbonaceous material is preferably between about 1,100° and about 1,300°F.

In view of the fore going description of the invention including the various examples and in the drawings, it is apparent that the process of the present invention includes a modification in which gaseous reducing material, such as carbon monoxide, is added to flue gas containing entrained fly ash at a point between the combustion zone of a coal-burning furnace and the separator for fly ash. It is preferred that carbon monoxide be added in an amount required for reduction of sulfur dioxide and that an aliphatic hydrocarbon be added to the flue gas for the purpose of reducing the concentration of oxygen gas in the flue gas to a valve such that the carbon monoxide, in view of its concentration, can effectively reduce the sulfur dioxide. It is also preferred that the aliphatic hydrocarbon, particularly methane, be added upstream of the zone of addition of the carbon monoxide.

Various modifications of the process of the present invention will be apparent to those of ordinary skill in this art in view of the foregoing description of the invention. The process of the present invention is not limited by the examples that have presented because they are merely illustrative of the invention. Thus, the invention is limited only by the claims that follow.

We claim:

1. In the process for the removal of sulfur dioxide as elemental sulfur from an initial gas containing a minor concentration of sulfur dioxide and more than 0.1 by volume of oxygen, comprising admixing said initial gas and a gaseous reducing material selected from the group consisting of carbon monoxide, aliphatic hydrocarbon, hydrogen sulfide, and hydrogen, reacting at an elevated temperature said sulfur dioxide with said reducing material in said admixture in the presence of a catalyst for said reaction so as to form elemental sulfur from a major portion of said sulfur dioxide, and separating said elemental sulfur from the reaction product gas, the improvement which comprises:

using, as said catalyst, fly ash present in flue gas obtained from the burning of coal in a steam plant furnace; and pretreating said initial gas by contacting said initial gas, at an elevated temperature, only with a material selected from the group consisting of a solid carbonaceous material and an aliphatic hydrocarbon for sufficient time to reduce substantially the oxygen concentration before said treatment for catalytic reduction of sulfur dioxide, said elevated temperature of said pretreatment being between about 1,100° and about 1,300° F. when said material is said carbonaceous material, and between about 1,000° and about 1,400° F. when said material is said aliphatic hydrocarbon.

2. The process of claim 1 wherein said initial gas in smelter gas.

3. The process of claim 1 wherein said initial gas is flue gas.

4. The process of claim 3 wherein said material used to pretreat said flue gas as the initial gas is said carbonaceous material.

5. The process of claim 4 wherein said carbonaceous material is coke, said gaseous reducing material used for the catalytic reduction of sulfur dioxide is carbon monoxide, and the catalytic reduction is at a temperature of about 950° to about 1,100° F.

6. The process of claim 6 wherein said flue, gas as the initial gas, contains about 3.5 percent oxygen, said pretreatment utilizes sufficient carbon monoxide and sufficient time of pretreatment to reduce the oxygen content to less than 1.4 percent.

7. The process of claim 6 wherein the amount of carbon monoxide and the time of pretreatment are sufficient to reduce the oxygen content to less than 0.1 percent.

8. The process of claim 3 wherein
the material used to pretreat said flue gas as the initial gas is an aliphatic hydrocarbon,
the pretreatment and the catalytic reduction are performed on the flue gas, while it still has fly ash entrained with it, at zones between the combination zone of a furnace burning a sulfur-bearing coal and a zone for separating the entrained fly ash from the gas before emitting the latter to the atmosphere, said zones for said pretreatment and said subsequent catalytic reduction being between said fly-ash-separating zone and a cooling zone that cools said fly-ash-entrained flue gas emanating from said combustion zone,
only said hydrocarbon being introduced into said pretreatment zone for admixture with said fly-ash-entrained flue gas for said substantial reduction of said oxygen content at said temperature of between about 1,000° and about 1,400° F.,
said gaseous reducing material being introduced into said catalytic reduction zone for admixture with said fly-ash-entrained flue gas from said pretreatment zone,
said catalyst for said catalytic reduction zone consists of said entrained fly-ash,
said oxygen-reduced, fly-ash-entrained flue gas from the pretreatment zone being raised in temperature for admixture with the reduction by said gaseous reducing material in said catalytic reduction zone at a temperature of at least 1,600° F. when said gaseous reducing material is an aliphatic hydrocarbon, and
admixture of said oxygen-reduced, fly-ash-entrained flue gas and said gaseous reducing material in said catalytic reduction zone being between about 950° and about 1,100° F. when said gaseous reducing material is carbon monoxide.

9. The process of claim 8 wherein said aliphatic hydrocarbon, introduced into the pretreating zone, is a gas consisting essentially of methane, and the gaseous reducing material, introduced into the catalytic reduction zone, is a gas consisting essentially of methane.

10. The process of claim 8 wherein the gaseous reducing material, introduced into the catalytic reduction zone is carbon monoxide.

11. The process of claim 9 wherein the combustion zone is operated to produce a flue gas containing 3.5 percent oxygen and the amount of methane introduced into the pretreatment zone is sufficient to reduce the content of flue gas to below about 0.1 percent.

UNITED STATES PATENT OFFICE
CERTIFICATE OF CORRECTION

Patent No. 3,615,219   Dated   October 26, 1971

Inventor(s)   Pranas Budininkas, et al

It is certified that error appears in the above-identified patent and that said Letters Patent are hereby corrected as shown below:

Column 1, line 6, change "of" before "all" to read -- or -- . Column 2, line 41, change "is" after "oxygen" to read -- in -- . Column 3, line 55, change "11-1967" to read -- 11-15, 1967 -- . Column 5, line 2, change "Fly ash" to read -- Flyash -- . Column 10, line 64, change "hr.$^{11}$" to read -- hr.$^{-1}$ -- . Column 12, line 1, after "ratio" insert -- is -- . Column 14, line 38, change "is" to -- in -- . Column 15, line 2, change "sue" to read -- use -- . Column 16, Table 7, Test No. 97, change "0.63" to read -- 0.03 -- . Column 17, line 27, change "value" to read -- valve -- ; line 43, change "0.1" to read -- 0.1 percent -- . Column 18, line 12, change "claim 6" to -- claim 5 -- and same line, change "flue, gas" to -- flue gas -- ; line 25, change "combination" to -- combustion -- ; line 48, change "admixture" to -- said admixture -- ; line 62, change "claim 9" to -- claim 10 -- ; line 65, change "content" to -- oxygen content -- .

Signed and sealed this 10th day of October 1972.

(SEAL)
Attest:

EDWARD M. FLETCHER, JR.
Attesting Officer

ROBERT GOTTSCHALK
Commissioner of Patents